United States Patent [19]

McCann, Sr.

[11] Patent Number: 5,074,708

[45] Date of Patent: Dec. 24, 1991

[54] UNDERGROUND WATER CONTROL SYSTEM FOR TENNIS COURTS AND THE LIKE

[75] Inventor: John J. McCann, Sr., Morehead City, N.C.

[73] Assignee: Calico Racquet Courts, Inc., Beaufort, N.C.

[21] Appl. No.: 481,351

[22] Filed: Feb. 14, 1990

[51] Int. Cl.$^5$ ............... F02B 11/00; A01G 25/00
[52] U.S. Cl. .................................. 405/38; 105/36; 105/43; 105/45
[58] Field of Search ............ 405/37, 43, 36, 38, 405/45; 239/145, 542

[56] References Cited

U.S. PATENT DOCUMENTS

| | | |
|---|---|---|
| 728,088 | 5/1903 | Dillon . |
| 1,171,558 | 2/1916 | Taylor . |
| 1,171,559 | 2/1916 | Taylor . |
| 1,224,692 | 5/1917 | Tucker . |
| 1,665,104 | 4/1928 | Martienssen . |
| 2,075,590 | 3/1937 | North ........................... 47/48 |
| 2,605,589 | 8/1952 | Kuestner ........................ 47/56 |
| 2,768,028 | 10/1956 | Robinson ...................... 405/37 |
| 2,863,698 | 12/1958 | Richards ................... 405/37 X |
| 3,114,243 | 12/1963 | Winters ....................... 405/37 |
| 3,115,726 | 12/1963 | Sayles ..................... 405/154 X |
| 3,233,414 | 2/1966 | Hansen, Jr. et al. . |
| 3,408,818 | 11/1968 | Hemphill ................... 405/37 |
| 3,446,025 | 5/1969 | Koch ......................... 405/43 |
| 3,540,223 | 11/1970 | Ebbe .......................... 405/43 |
| 3,908,385 | 9/1975 | Daniel et al. . |
| 4,023,506 | 5/1977 | Robey ..................... 405/43 X |
| 4,227,266 | 10/1980 | Russell ......................... 4/496 |
| 4,257,191 | 3/1981 | Holter et al. .............. 47/48.5 |
| 4,268,993 | 5/1981 | Cunningham ................ 47/58 |
| 4,431,338 | 2/1984 | Hornabrook ............... 405/37 |
| 4,462,184 | 7/1984 | Cunningham ........... 405/37 X |
| 4,576,511 | 3/1986 | Vidal, Jr. .................... 405/37 |
| 4,832,526 | 5/1989 | Funkhouser, Jr. ............ 405/43 |
| 4,881,846 | 11/1989 | Burkstaller ................. 405/37 |

FOREIGN PATENT DOCUMENTS

| | | |
|---|---|---|
| 111978 | 9/1964 | Czechoslovakia . |
| 2727954 | 1/1979 | Fed. Rep. of Germany . |
| 2727955 | 1/1979 | Fed. Rep. of Germany . |
| 482615 | 7/1953 | Italy . |
| 2035098 | 6/1980 | United Kingdom . |

*Primary Examiner*—Dennis L. Taylor
*Attorney, Agent, or Firm*—Bell, Seltzer, Park & Gibson

[57] ABSTRACT

The tennis court has water impervious bays which contain water distribution piping and particulate material that conducts water from the bottom of the bays upwardly by capillary action to the playing surface of the court. The water distribution piping includes a substantially rigid outer pipe having relatively large openings extending through its lower portion, and at least one inner pipe that is located within the outer pipe and that has a plurality of water discharge orifices at spaced locations along its length. Water from a supply source is introduced into the inner pipe, at a desired low pressure and flow rate, at those times when a moisture sensor determines that the sensed moisture content within the particulate material adjacent the playing surface of the court is less than a preselected desired magnitude. Valving associated with the water distribution piping permits purging and/or draining of the piping. A technique for constructing the court includes the use of vertical pin members that temporarily support upstanding walls of the bays and an elongate leveling member which in a first rotative position establishes the elevation of the upper surface of a first particulate material layer, and which in a second position establishes the elevation of a second particulate material layer of the court.

19 Claims, 4 Drawing Sheets

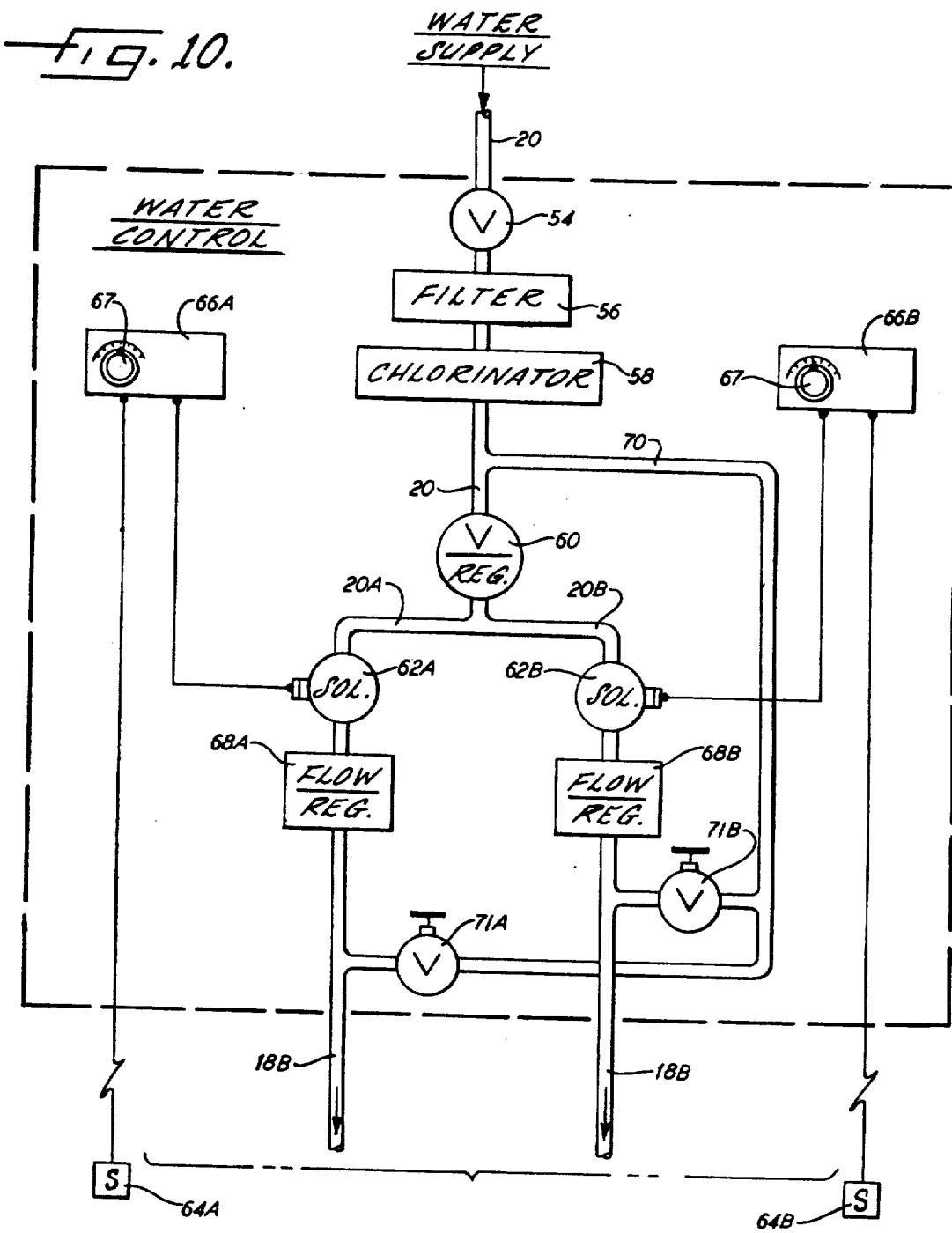

UNDERGROUND WATER CONTROL SYSTEM FOR TENNIS COURTS AND THE LIKE

This invention relates to underground watering systems, and more particularly to systems for controlling the amount of moisture within "soft" tennis courts of the type having a playing surface comprised of a layer of crushed green stone, brick or similar particulate material.

BACKGROUND OF THE INVENTION

"Soft" tennis courts of the aforesaid type are superior in various respects to courts having asphalt, cement or other "hard" playing surfaces. It is necessary, however, to maintain a proper amount of moisture within the upper layer of particulate material of a soft court. While above-ground sprinklers are commonly used to periodically "water" soft courts, this technique is wasteful of water, reduces court playing time, and is otherwise less than desirable.

In recognition of the foregoing, it has heretofore been proposed to provide underground watering systems for tennis courts of the type in question. One such known system includes bay means formed of water impervious material, a layer of relatively large ballast rocks overlying the bay means, a water permeable membrane or fabric overlying the ballast rocks, and a layer of relatively fine particulate material overlying the fabric and underlying the uppermost layer of particulate material that contains the playing surface of the court. Water is introduced into and conducted from the bay means via a sump or reservoir having water inlet and outlet means controlling the water level in the sump and in the bay means. During normal operation of the system the water level within the bay means is maintained closely adjacent the water permeable fabric overlying the layer of ballast rocks. When the water level is below the fabric, no water passes from the layer of ballast rock to the material thereabove. When the water level is at or above the membrane, water passes upwardly by capillary action through the particulate material overlying the fabric. A disadvantage of the system is that it is wasteful of water. The considerable volume of water constantly maintained within the bay means, within the sizeable spaces between the ballast rock underlying the permeable fabric, serves only as "filler". In addition to not being substantively used, such water creates a hydraulic pressure head which accelerates escape of water from the bay through any openings that might inadvertently be present in the impervious material of which the bay is formed. Even more importantly, the system does not utilize any significant amount of the rainfall or other precipitation deposited upon the court after it has been placed in operation. Substantially all of the rain water thereafter passing downwardly through the court into the bay means is promptly discharged therefrom and is unavailable for future use in the system.

Another previously proposed system has a plurality of water impervious bays that are spaced considerable distances in a lateral direction from each other and that are of concave, rather than substantially flat, shape. Each bay contains a perforate and centrally located water supply pipe, and a layer of particulate material through which water can migrate by capillary action. A water permeable fabric or membrane overlies the upper surface of the particulate material within the bays, and also overlies the upper surface of the ground intermediate such bays. The water permeable membrane or fabric is in turn overlaid by a plurality of additional layers of particulate material, which include an uppermost layer containing the playing surface of the tennis court, that are also capable of conducting water upwardly by capillary action. In keeping with the first system described above, the aforesaid system also is wasteful of water. The laterally spaced concave bays are capable of containing only limited quantities of water. Once the bays are filled most of any additional water passing thereto, either from the water supply pipes or from rainfall upon the court, will drain from the system through the wide expanses of earth that are present between the bays and that are covered only by the water permeable fabric. The water supply to the upper surface layer of the court will also be quite non-uniform since those areas of the court overlying the spaced bays will receive considerably more water than those areas overlying the earthen spaces between the bays.

SUMMARY OF THE INVENTION

The present invention provides an improved underground water control system for tennis courts, which system conserves and makes maximum use of water supplied to it, achieves substantially uniform water distribution, and possesses other significant advantages.

In a preferred embodiment thereof, the system of the invention includes bay means that is substantially coextensive with the court area and that is formed of water impervious material. The bay means contains water conducting piping means, and at least one layer of particulate material capable of conducting water upwardly by capillary action from the bay means to an uppermost layer of greenstone or similar particulate material that defines and terminates at the playing surface of the court. The piping means preferably includes an outer pipe having at spaced locations along its length relatively large openings through which water can freely pass, and at least one inner pipe that is disposed within and extends longitudinally of the outer pipe. Preferably there are first and second inner pipes that extend through the outer pipe in laterally adjacent relationship to each other and that have longitudinally spaced orifices via which water introduced into the first of the inner pipes is discharged laterally into the second of the inner pipes. The second one of the inner pipes also has longitudinally spaced orifices through which water is discharged into the outer pipe, and then into the bay means via the openings in the outer pipe. The system further includes water control means for controlling the delivery of water from a supply source to the first one of the inner pipes. The control means preferably includes at least one moisture sensor that senses the moisture level within a preselected location of the court, and that automatically effects operation of valve means that controls the flow of water from the supply source to the first pipe. The control means preferably further includes means for regulating the pressure and flow rate of the water introduced into the system from the source. A layer of water permeable fabric or the like preferably overlies the water piping so as to prevent obstruction of the openings and orifices therein by the particulate material within the bay means. The system preferably further includes drain valves for at desired times permitting draining and/or purging of the piping means.

The invention also provides an improved method of constructing a tennis court of the above-described type, which method includes use of upstanding pin members to temporarily support confronting walls of adjacent ones of the bay members, and to also support an elongate member which in a first rotative position establishes the desired grade and depth of a first layer of particulate material, and in a second rotative position establishes the desired depth and grade of a second layer of particulate material that overlies the first layer. The elongate member additionally may be and preferably is used to discourage particulate material of the first layer from entering the space between the confronting bay walls during formation of such layer.

BRIEF DESCRIPTION OF THE DRAWINGS

Other features of the invention will be apparent from the following description of an illustrative embodiment thereof, which should be read in conjunction with the accompanying drawings, in which:

FIG. 10 is a schematic representation of water distribution control components and circuitry of the watering system.

DESCRIPTION OF THE PREFERRED EMBODIMENT

Figure 1:
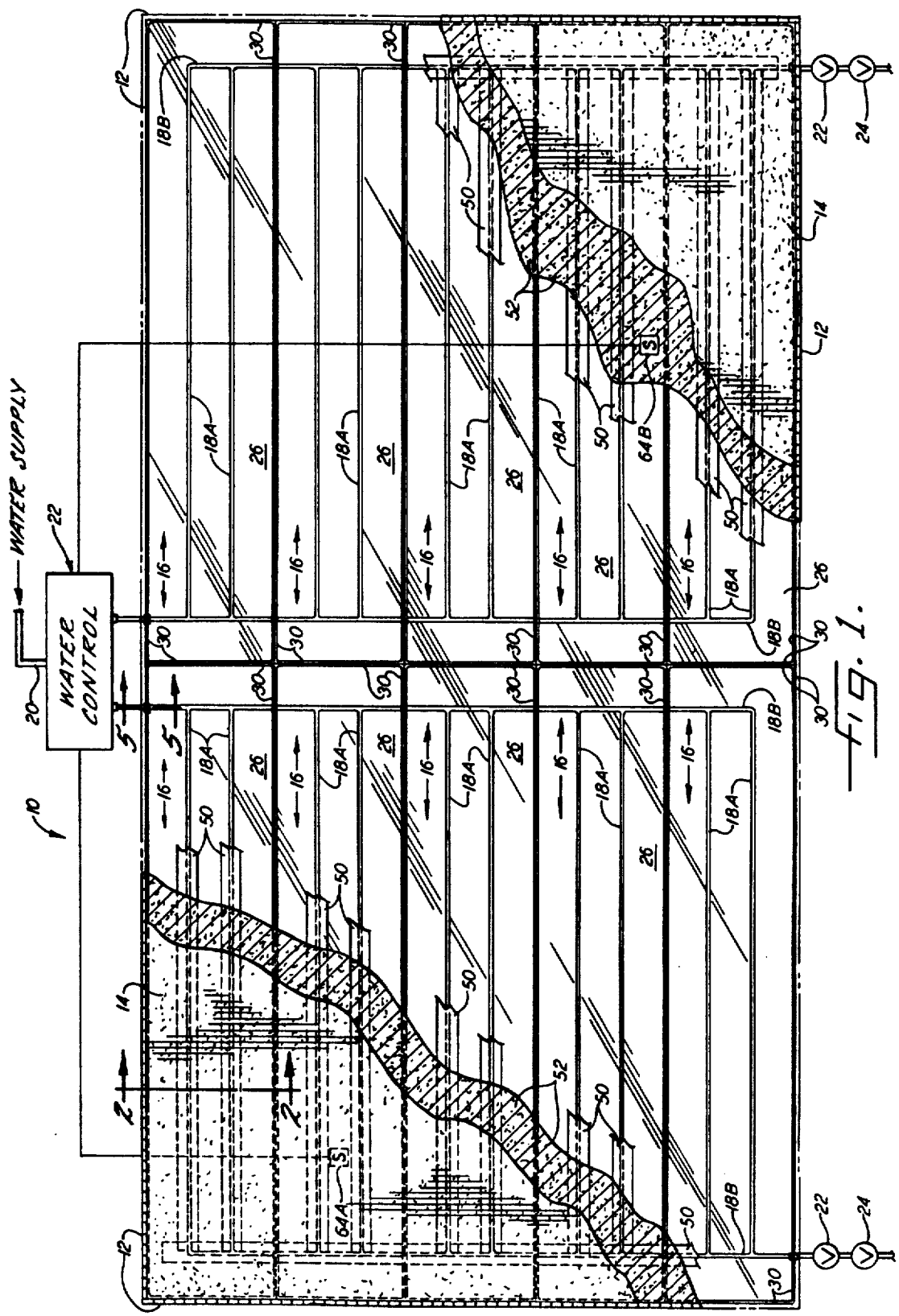
FIG. 1 is a partially diagrammatic top plan view of a tennis court having a water control system in accordance with the invention, some components being broken away so as to better disclose underlying components.
Figure 2:
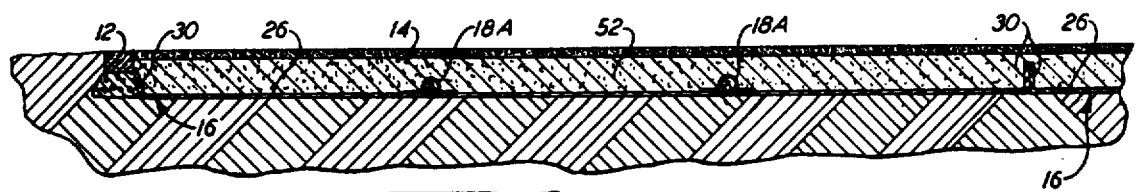
FIG. 2 is a fragmentary sectional view taken generally along the line 2—2 of FIG. 1.

The numeral 10 in FIG. 1 designates a "soft" tennis court that is bordered along its opposite sides and ends by a brick and concrete curb 12. Court 10 has an uppermost playing surface, only fragmentarily shown in FIG. 1 but extending over the entire court area, comprised of a layer 14 of crushed green stone, crushed brick or other particulate tennis court surfacing material capable of conducting water by capillary action. As is well known to those skilled in the art, proper maintenance of a "soft" court such as court 10 requires that an appropriate amount of moisture be maintained within playing surface layer 14. To this end, court 10 is provided with a water control system which generally includes bay means, illustratively and preferably in the form of a plurality of contiguous bay members 16; water distribution piping means disposed within the bay means and including a plurality of interconnected lengths of water distribution piping 18; water supply means that includes a water supply pipe 20; water control means 22 for controlling the passage of water from the water supply means to the water distribution piping 18; and water drainage means that includes terminal sections of piping 18 and drainage valves 22, 24 associated therewith.

Bay members 16 are formed of durable water impervious material such as polyethylene. Each bay has a substantially horizontal bottom wall 26 that overlies and is supported by a substantially flat foundation 28, which may be and illustratively is graded and compacted earth. Each bay 16 also has a plurality of upstanding side and end walls 30 that project upwardly from the edges of its bottom wall 26. Illustratively ten bays 16 are provided, five of these being on one side of the transverse center line of the court, and the remaining five upon the opposite side. Each bay 16 is approximately sixty feet long by approximately twelve feet wide, extends longitudinally substantially the entire distance between the transverse center line of the court and an end section of curb 12, and extends laterally approximately one-fifth of the distance between the opposite side sections of curb 12. Each upstanding wall 30 of bay members 16 preferably has a height of approximately four inches, and abuts either a thereto adjacent upstanding wall 30 of another of the bay members, or abuts a thereto adjacent section of curb 12. While bays 16 of the aforesaid approximate dimensions are preferred, ones of different sizes may be employed if desired. Additionally, the bay means could be defined by a single large bay member, but such a bay means would be difficult to construct and install.

Figure 5:
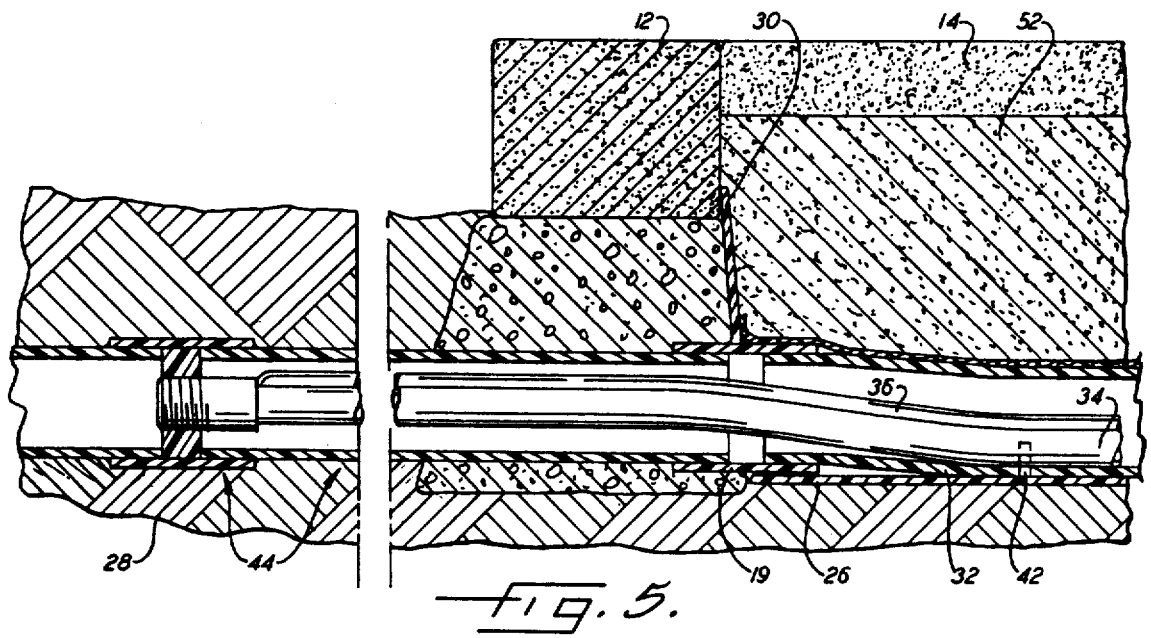
FIG. 5 is a fragmentary sectional view of water distribution piping and some adjacent components of the system and court.

Sections of the water distribution piping 18 rest upon bottom walls 26 of bay members 16. Illustratively the piping 18 associated with each bay member 16 includes two sections 18A that extend in substantially parallel, equally spaced relationship to each other and to the upstanding side walls of the bay member, along most of the length of the bay member. The water distribution piping 18 upon each side of the transverse center line of court 10 further includes two sections 18B that extend transversely of and, via suitable anti-leak fittings (not shown, but which may be similar to the fitting 19 shown in FIG. 5), between the five bay members 16 upon their side of court 10. Each pipe section 18B adjacent the lateral center line of court 10 communicates via suitable fittings (not shown) with the ends of the longitudinal piping sections 18A that are adjacent to and on the same side of the lateral center line of court 10, while the other of the transverse pipe sections 18B similarly communicates with the opposite, curb-adjacent ends of the longitudinal pipe sections 18A upon the court side in question.

Figure 3:
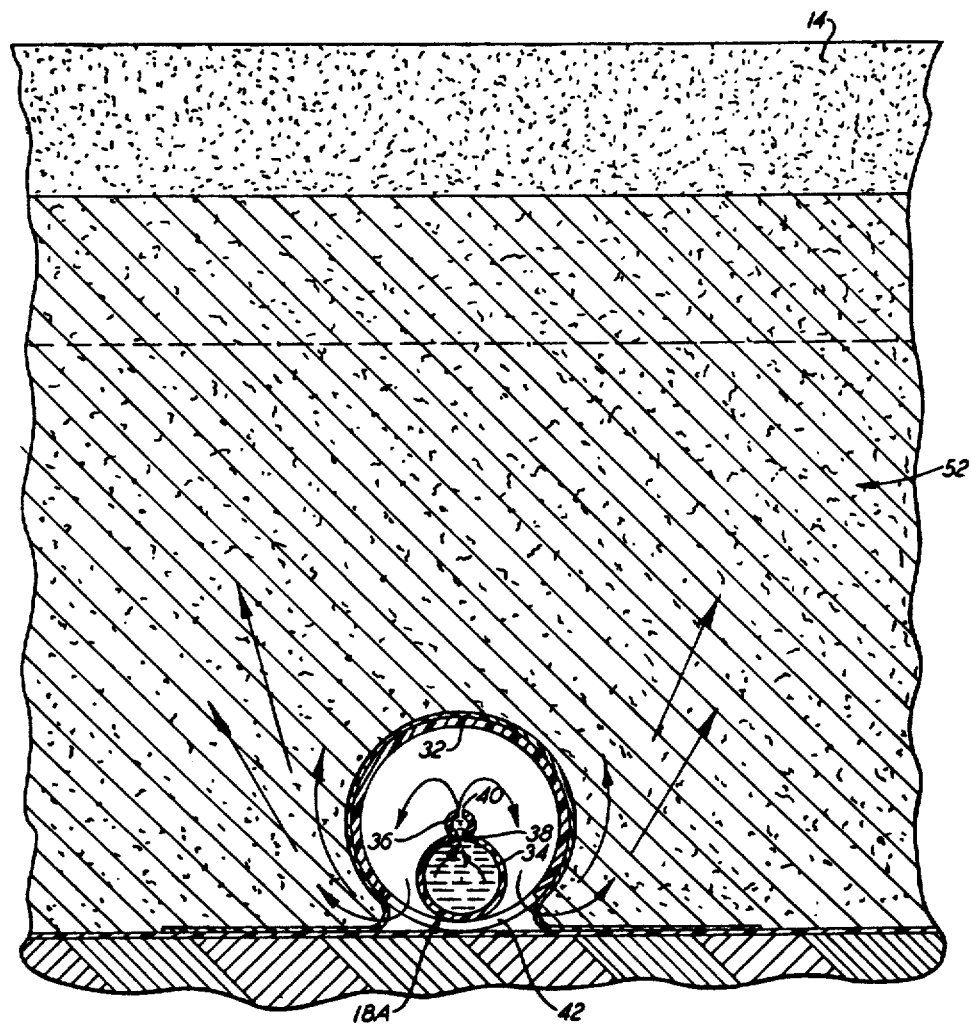
FIG. 3 is an enlarged fragmentary view showing in transverse section water distribution piping and adjacent system components shown in FIG. 2.
Figure 4:
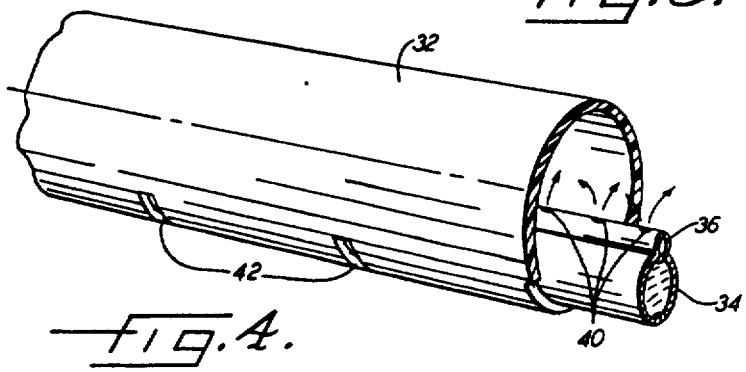
FIG. 4 is a fragmentary perspective view of the water distribution piping.

As is best shown in FIGS. 3 and 4 of the drawings, piping 18 illustratively and preferably includes an outer pipe 32 made of PVC or other substantially rigid material, and flexible superimposed lower and upper inner pipes 34, 36 that are disposed within outer pipe 32 and that extend longitudinally thereof in parallel relationship to each other. Lower pipe 34 is of smaller diameter than outer pipe 32 and of considerably larger diameter than upper inner pipe 36. Pipes 34, 36 preferably and illustratively are integrally connected to each other at their confronting surfaces, and at spaced intervals along the length thereof are provided with a plurality of small diameter orifices 38 via which water introduced into lower pipe 34 passes, following filling of the lower pipe throughout substantially its entire length, into upper pipe 36. At spaced intervals along the length of its upper surface pipe 36 has a plurality of similar small diameter orifices 40. After pipe 36 becomes filled throughout substantially its entire length, water passes from it via orifices 40 into the interior of outer pipe 32 and then from the lower portion thereof through a plurality of relatively large slot-like openings 42 that extend at longitudinally spaced intervals transversely through the lower portion of pipe 32. The upstream end of the inner pipe 34 of each transverse piping section 18B adjacent the lateral center line of court 10 is connected by a suitable fitting assembly 44 (FIG. 5) to water supply pipe 20 (FIGS. 1 and 10) via suitable water control components hereinafter described. Each of the transverse pipe sections 18B adjacent an end of court 10 has a terminal downstream portion (see FIG. 1), preferably and illustratively located outside of the court area. Normally closed valves 46, 48 are respectively associated with the pipes 32, 34 of such terminal piping portion. Opening of the valves 46 drains water from bay members 16 via pipes 32. Valves 48 are opened when draining or purging of inner pipes 36, 38 is desired.

The piping sections 18A, 18B within bay members 16 are overlaid along substantially their entire lengths by strips of geotextile fabric 50 or similar material, the side edge portions of which engage the bay bottom walls 26. The foregoing components are in turn overlaid by a layer 52 of washed hard particulate screenings material, of a type (e.g., granite) not soluble in water, a preferred gradation of which is as follows:

| Screen Size | Passing |
| --- | --- |
| 1" | 100% |
| No. 4 | 80-100% |
| No. 100 | 10-30% |
| No. 200 | <10% |

Layer 52 extends above, preferably by one inch, the upstanding walls 30 of members 16. It is overlaid by the previously-mentioned uppermost layer 14, of particulate tennis court surfacing material, that extends to and defines the playing surface of court 10. The particulate material of layer 52 readily conducts water by capillary action, in keeping with the material of layer 14, but is much less costly than the material of layer 14. Geotextile fabric 50 is water permeable, but prevents the particulate screenings material of layer 52 from obstructing the slot-like openings 42 of outer pipe 32 of water distribution piping 18.

FIG. 10 of the drawings, to which reference is now made, schematically discloses means for effecting and regulating passage of water at desired times from water supply pipe 20, which is connected to a city water main (not shown) or other suitable water supply source, to pipes 34 of water distribution piping 18. Water within pipe 20 passes sequentially through a normally open valve 54, a filter 56 and, if desired, an optional chlorinator 58. Filter 56 and chlorinator 58 remove iron particles and/or other extraneous matter which if present in the water might clog the orifices 38, 40 (FIG. 3) of pipes 34, 36. The Water normally next passes through a pressure regulator 60 that reduces the pressure of the incoming water, which pressure usually would be about forty p.s.i., to a lower magnitude, preferably approximately six p.s.i., that will not stress flexible pipes 34, 36 to such an extent as might unduly lessen their useful life. Downstream of regulator 60, pipe 20 divides into two branches 20A, 20B. Branch 20A supplies water at desired times via fitting 44 (FIG. 5) to the water distribution piping 18 upon one side (the left side, as viewed in FIG. 1) of the lateral center line of court 10, and branch 20B similarly provides water to the water distribution piping 18 upon the opposite side of the lateral center line of the court. Branch 20A contains an electrically operated valve 62A that is connected to a moisture sensor 64A via an adjustable control device 66A that is also connected to a power source (not shown). Branch 20A further contains, at a location downstream from the foregoing components, a flow regulator 68A which limits the flow rate of water passing through it to a preselected low magnitude, preferably approximately one gallon per minute. A by-pass line 70 communicates with line 20 upstream of pressure regulator 60A and, when a normally closed valve 71 therein is open, With a part of branch 20A downstream of flow regulator 68A. Components identical to those described in connection with branch 20A are also provided in association with branch 20B and are identified in the drawings by the same reference numerals but with the suffix B.

Sensors 64A, 64B are buried in the particulate material of court 10, preferably adjacent the interface between particulate material layers 14, 52, upon the respective opposite left and right (as viewed in FIG. 1) sides of court 10. If there are locations upon the surface of court 10 that tend to become dry before the remainder of the court surface, the sensors preferably are placed at such locations. The relative wetness or dryness of an upper layer 14 formed of crushed green stone, or of different areas of it, can be visually ascertained since the color of that material changes with its moisture content. When the moisture content of the particulate material adjacent either sensor 64A or 64B falls below a magnitude preselected by the adjustive setting of an adjustable control member 67 of the thereto connected control device 66A or 66B, such device causes the thereto connected one of the valves 62A or 62B to open, and to remain open until the sensed moisture reaches the preselected magnitude. This occurs when the water introduced into bays 16 via the water distribution piping 18 passes upwardly by capillary action to the sensor 64A, 64B associated with the valve 62A, 62B in question. The relatively low pressure and flow rate of the water introduced into pipe 34 of the water distribution piping allows such pipe and the associated pipe 36 to become filled throughout their entire extent before any significant amount of water is discharged through orifices 40 and passes therefrom, via the slot-like openings 42 of outer pipe 32 (FIG. 3), into the bays 16. This, in conjunction with the substantially uniform arrangement of the water distribution piping 18 upon each lateral side of court 10, contributes significantly to the uniformity of the water distribution to and within bays 16 and, after the system has become fully charged, to and within the particulate material overlying such bays, upon each lateral side of court 10. The relatively low pressure and flow rate of the water introduced into pipe 34 also prevents, in association with the outer pipe 32, water from being expelled so violently from water distribution piping 18 as to create undesirable "bulges" or other irregularities in the upper surface of particulate layer 14 of the court. This would otherwise be particularly likely to occur during initial charging of the system. It will be appreciated that after pipes 34, 36 have been filled they will, unless deliberately drained, tend to remain substantially full due to the small size and upward locations of their orifices 38, 40.

In contrast to certain of the prior art tennis court watering systems, all water introduced by piping 18 into bays 16 is substantively utilized, and none of it is wasted. However small the amount of water upon the bottom walls of bays 16, it will pass upwardly by capillary action from the bays through the overlying particulate material and to the playing surface of the court, unless such material becomes saturated. In addition to making maximum substantive use of water introduced into it via supply pipe 20, the present court watering system conserves water by making maximum utilization of rainwater or other precipitation deposited upon it. When the rainwater deposited upon the court is of sufficient volume, it will drain downwardly through the particulate material layers 14, 52 to bottom wall 26 of bays 16, and then will rise upwardly and fill the interstices of the particulate material layers. The amount of "free" water capable of being thus stored for subsequent utilization within the particulate material layers is believed to be approximately 3,000 gallons. Although the aforesaid water will create a pressure head tending to accelerate the leakage of water from the bays via any holes or the like in the bay walls, the fine nature of the particulate material of layer 52 is such as to not create any holes, and as to "plug" any that might be present. In areas where there is significant periodic rainfall, therefore, it will be appreciated that maintenance of a desired moisture content within the particulate material layer 14 may be achieved for extended periods of time without drawing any water from supply pipe 20.

If the precipitation should be so great as to result in complete saturation of court 10 and the formation of puddles upon its upper surface, such condition may be quickly eliminated by opening the valves 22 (FIG. 1) at the terminal ends of pipes 42 and thus causing drainage of water from bays 16 via pipes 42 until the amount of water within court 10 has been reduced to the desired extent. Valves 22 are then closed to retain for subsequent substantive use, when needed, the remaining water within the bays.

The valves 24 (FIG. 1) at the downstream ends of pipes 34 of the water distribution piping 18 are opened when it is desired to drain such pipes, as might be desirable when ambient temperatures are extremely low, or when it is desired to purge such pipes and the thereto connected smaller pipes 36. During purging of the pipes 34, 36 upon the left (as viewed in FIG. 1) side of lateral center line of court 10, the Valve 71A (FIG. 10) in the bypass line 70 of the water control means is opened, while the valve 71B remains closed. This causes the water then directed through pipes 34, 36 to be at a high pressure (e.g., 40 p.s.i.) and flow rate enhancing the efficacy of the purging. When the purging is of the pipes 34, 36 upon the opposite side of the lateral center line of court 10, valve 71B is opened and valve 71A remains closed.

Figure 6:
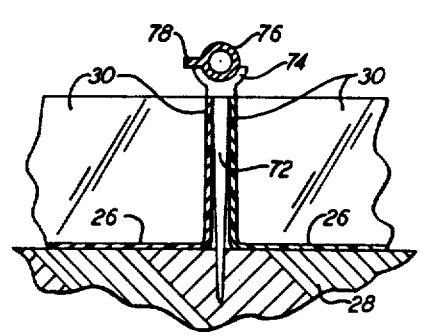
FIGS. 6–9 are sequential fragmentary sectional views illustrating method steps and apparatus used in constructing the tennis court.
Figure 7:
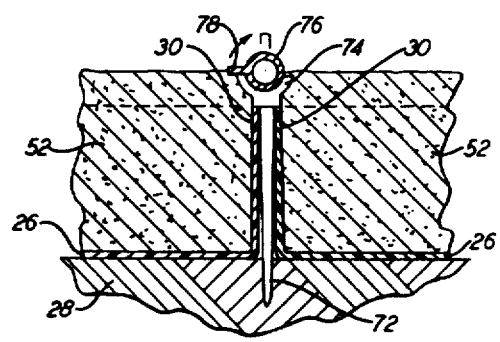
Figure 8:
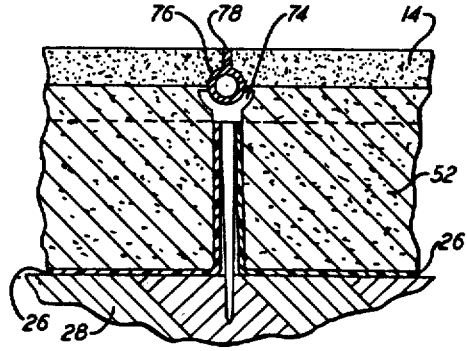
Figure 9:
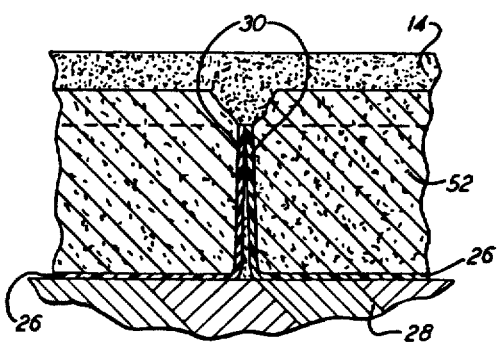

FIGS. 6–9 of the drawings, to which reference is now made, disclose construction techniques that may be advantageously used to facilitate installation of bays 16 and leveling of the particulate material deposited within and projecting upwardly from such bays. As is indicated in FIG. 6 of the drawings, the upstanding walls 30 of bays 16 that are not in abutting engagement with an adjacent section of curb 12 (FIGS. 1 and 5) are temporarily supported, during installation of the bays in question, by vertically extending pin members 72 that are driven into the base material 28 between the confronting bay walls 30 at spaced intervals along their length. Each pin member 72 has at its upper end an arcuate support member 74 that underlies and releasably supports an elongate leveling member 76 which extends at least the full length of the confronting upstanding bay walls 30. Leveling member 76 has a main body of circular cross-sectional shape complementary to the shape of the upper surface of pin member 74, and has a leveling element 78 extending longitudinally thereof and projecting radially from its main body. In the rotative position of member 76 thereof shown in FIG. 6, leveling element 78 extends substantially horizontally and the vertical distance between it and bay bottom wall 26, which distance is adjusted by varying the height of the supporting pin members 72, equals the vertical dimension (preferably, as previously noted, approximately five inches) of the lower particulate material layer 52 to be formed in such bays. As is indicated in FIG. 7, a layer 52 of the desired depth and grade can be formed simply by continuing to introduce the particulate material into such bays until the compacted upper surface thereof is substantially coplanar with the horizontally extending leveling element 78. In addition to its leveling function, member 76 also minimizes passage of the particulate material into the space between the confronting walls 30 of the adjacent bays 16, while such bays are being filled with the material. As is indicated by the arrow in FIG. 7, member 76 is then rotated to another position wherein leveling element 78 extends substantially vertically, as shown in FIG. 8. The length of element 78 is such that its upper end surface then is substantially coplanar with the plane of the desired upper surface of the compacted upper particulate material layer 14 (FIGS. 8 and 9). Such layer may therefore be readily formed simply by adding and compacting the particulate material of such layer until the upper surface thereof is coplanar, as illustrated in FIG. 8, with the upper end surface of leveling element 78. Following the foregoing, leveling member 76 and pin member 72 are withdrawn upwardly from the particulate material, and the space previously occupied by the foregoing elements is filled with additional quantities of the particulate material and is then compacted. Upon removal of pin members 72, the upstanding bay walls 30 previously supported thereby flex inwardly into abutting engagement with each other, as indicated in FIG. 9, due to the weight of the particulate material within the bays.

While preferred embodiments of the invention have been specifically shown and described, this was for purposes of illustration only, and not for purposes of limitation, the scope of the invention being in accordance with the hereinafter presented claims.

I claim:

1. An underground water control system for a tennis court having a playing surface requiring watering, comprising:

water impervious bay means underlying substantially all of said playing surface for receiving and storing water, including rainwater deposited upon said court, passing thereto;

a water supply source;

water piping means connected to said water supply source and located within said bay means for at desired times receiving water delivered thereto from said supply source and for introducing said water into said bay means substantially simultaneously at a plurality of spaced different locations, said piping means including a plurality of outer pipes, and first and second laterally interconnected inner pipes disposed within and extending longitudinally of each of said outer pipes;

particulate material disposed within and extending upwardly from said bay means for conducting water upwardly therefrom by capillary action to said playing surface of said court; and control means for controlling the delivery of water from said supply source to said piping means water delivered from said supply means to said piping means passing sequentially to said first ones of said inner pipes, to said second ones of said inner pipes, and to said outer pipes, to enhance uniformity of distribution of the water throughout said court.

2. A system as in claim 1, wherein said control means includes a pressure regulator for reducing to a preselected low magnitude the pressure of water delivered to said piping means from said supply source.

3. A system as in claim 1, wherein said control means includes a flow restricting member for restricting to a preselected low magnitude the flow rate of water delivered to said piping means from said supply source.

4. A system as in claim 1, wherein said control means includes a moisture sensor for sensing the moisture content at a preselected location in said particulate material, and electrically operated valve means connected to said sensor for effecting delivery of water from said supply source to said piping means when the moisture content at said location is less than a preselected magnitude.

5. A system as in claim 1, wherein said outer pipes are substantially rigid and have at spaced intervals along their length a plurality of openings from which water delivered to said piping means from said water supply source freely passes into said bay means.

6. A system as in claim 5, wherein said interconnected inner pipes include an upper pipe and a lower pipe having a plurality of small orifices at spaced locations along the length thereof for conducting water received by said lower pipe to said upper pipe.

7. A system as in claim 6, wherein said upper one of said inner pipes further has a plurality of small orifices at spaced locations along the upper surface thereof for discharging water received thereby from said lower one of said inner pipes into said outer pipe of said piping means.

8. An underground water control system for a tennis court having a playing surface requiring watering, comprising:
water impervious bay means underlying said playing surface;
a water supply source;
water distribution piping means for at first desired times introducing water form said supply source into said bay means, and for at other desired times draining water from said bay means, said piping means including a plurality of substantially rigid outer pipes having at spaced intervals along their length a plurality of openings from which water freely passes into said bay means during introduction of water from said supply source, and into which water from said bay means freely passes during drainage thereof from said bay means, said piping means further including inner pipes disposed within and extending longitudinally of respective ones of said outer pipes, said inner pipes including first and second laterally interconnected inner pipes disposed within and extending longitudinally of each of said outer pipes;
particulate material disposed within said bay means and extending upwardly therefrom to said playing surface, said particulate material conducting water upwardly from said bay means by capillary action to said playing surface, the depth of said particulate material being substantially the same throughout said court; and
control means for controlling passage of water from said supply source to said water distribution piping means, water delivered from said supply means to said piping means passing sequentially to said first ones of said inner pipes, to said second ones of said inner pipes, and to said outer pipes, to enhance distribution of the water throughout said court.

9. A system as in claim 8, wherein said openings of said outer pipe are of slot-like shape and extent transversely through a lower surface portion of said pipe.

10. A system as in claim 9, wherein said bay means has a substantially horizontally extending bottom wall underlying substantially the entire extent of said playing surface.

11. A system as in claim 10, wherein said outer pipe engages said bottom wall of said bay means.

12. A system as in claim 11, wherein said particulate material includes a first type in a lower layer engaging and extending upwardly from said bottom wall of said bay means, and a second type in an upper layer overlying said first layer and extending to said playing surface of said court.

13. A system as in claim 12, wherein said particulate material of said lower layer is washed hard screenings.

14. A system as in claim 13, wherein said particulate material of said upper layer is crushed green stone.

15. A system as in claim 14, and further including water permeable fabric overlying said piping means.

16. A system as in claim 15, wherein said first and second inner pipes are of different diameters.

17. A system as in claim 16, wherein said first one of said inner pipes is located below said second one of said inner pipes, and said pipes have a plurality of small orifices extending therethrough at spaced locations along their length for passing water from said first inner pipe to said second inner pipe.

18. A system as in claim 17, wherein said second one of said inner pipe has a plurality of small orifices extending therethrough at spaced locations along its length for discharging water passed thereto from said first one of said inner pipes into the interior of said outer pipe.

19. A system as in claim 18, wherein said inner pipes are more flexible than said outer pipes and are connected to each other.

* * * * *

UNITED STATES PATENT AND TRADEMARK OFFICE
CERTIFICATE OF CORRECTION

PATENT NO. : 5,074,708
DATED      : 24 December 1991
INVENTOR(S): John J. McCann, Sr.

It is certified that error appears in the above-identified patent and that said Letters Patent is hereby corrected as shown below:

Column 5, line 51, "The Water" should read --The water--.

Column 6, line 6, "With" should read --with--.

Column 7, line 39, "Valve" should read --valve--.

Column 8, Claim 1, line 67, insert a comma after "means" and before "water".

Column 9, Claim 8, line 44, "form" should read --from--.

Signed and Sealed this

Thirtieth Day of March, 1993

*Attest:*

STEPHEN G. KUNIN

*Attesting Officer*   *Acting Commissioner of Patents and Trademarks*